E. BUGATTI.
VEHICLE WHEEL.
APPLICATION FILED MAR. 12, 1913.
1,105,179.
Patented July 28, 1914.
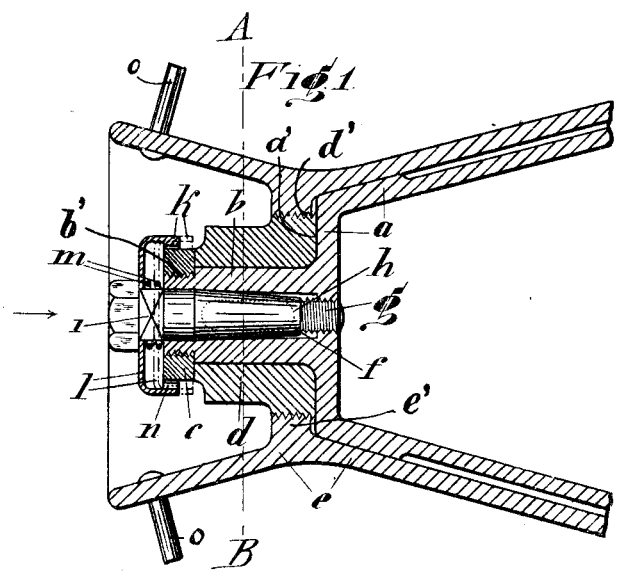
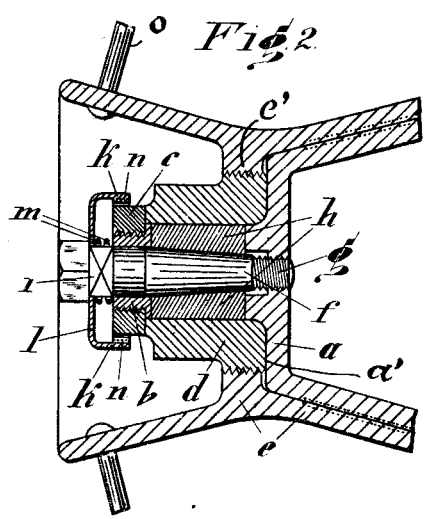
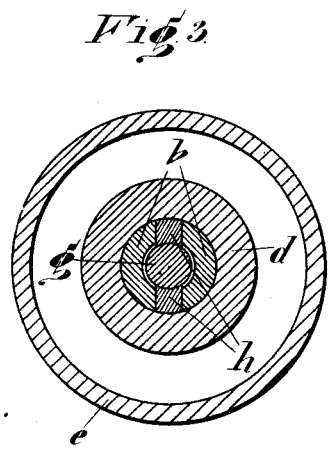
Witnesses:—
Inventor:—
Ettore Bugatti
by his attorney

UNITED STATES PATENT OFFICE.

ETTORE BUGATTI, OF MOLSHEIM, GERMANY.

VEHICLE-WHEEL.

1,105,179.     Specification of Letters Patent.     Patented July 28, 1914.

Application filed March 12, 1913. Serial No. 753,775.

*To all whom it may concern:*

Be it known that I, ETTORE BUGATTI, a subject of the King of Italy, and residing at Molsheim, Alsace, Germany, have invented certain new and useful Improvements in Vehicle-Wheels, of which the following is a specification.

The present invention has reference to improvements in vehicle wheels, and relates more particularly to improvements in demountable wheels such as are extensively used in automobiles for instance, and the particular object of the invention is to provide means whereby a wheel that may have become damaged may readily be exchanged for a reserve wheel and this latter then quickly and securely attached to the axle.

My improved construction is explained through reference to the accompanying drawing, in which—

Figure 1 represents a vertical, longitudinal section through a wheel-hub, embodying the essential features of my invention; Fig. 2 shows a horizontal, longitudinal section therethrough, and Fig. 3 shows a vertical cross-section on line A—B of Fig. 2.

The auxiliary or inner hub $a$ is rotatably secured on the wheel axle in any suitable manner, not specially shown, preferably by means of ball-bearings. At the outer free end this hub is reduced to form a trunnion-shaped tubular extension $b$ with screw threads $b'$ at the extremity, upon which screws nut $c$. Between this latter and the annular face $a'$ of the auxiliary hub $a$ rides on the trunnion $b$ the sleeve $d$, adapted to be rotatably operated by means of a socket wrench, or like suitable tool. This sleeve $d$, being thus secured against axial displacement, is provided at its inner, preferably enlarged end, with exterior screw-threads $d'$, with which threads the annulus $e'$ of the main or outer hub $e$, which latter fits snugly over the inner hub $a$ and carries at its outer cup-shaped end the spokes $o$. By turning the sleeve one way or the other, the outer hub $e$ may be brought into, or out of, frictional contact with the inner hub $a$.

For securing the sleeve $d$ against self-rotation there is provided centrally of the whole device a conically tapering screw bolt $f$, whose inner end $g$ screws into the inner hub $a$, and whose outer end is squared or prismatically shaped, as at $i$. In the tubular extension $b$ are provided two opposite slots in which slide loosely the wedges $h$, whose wedge surface corresponds to the taper of the screw bolt. By rotating this latter, its threaded end $g$ screwing into the inner hub $a$, these oppositely disposed wedges are forced outwardly, radially of the screw bolt axis, against the inner circumference of the sleeve $d$.

For securing the screw bolt against working loose, there is provided a locking cap $l$, having an internal toothed rim $k$ and snugly fitting over the profiled head $i$ of the screw bolt; a corresponding toothed rim $n$ is provided on the outer circumference of the nut $c$. A compression spring $m$ tends to ordinarily hold the cap in the operative position, shown in full lines in Figs. 1 and 2. The bolt $f$ and the nut $c$ are provided with right and left threads respectively, so that the parts are secured against inadvertently jarring loose.

Upon applying a socket wrench to the profiled screw bolt head in the direction of the arrow in Fig. 1, the cap is pressed inwardly against the action of the spring $m$ (broken line position in Fig. 1), with the result that the toothed rims $k$, $n$ become disengaged, when the screw bolt can freely be rotated. The wrench being withdrawn, the cap will recede again into the locking position.

For the purpose of removing a damaged wheel, the wrench is applied with inward pressure and the bolt $f$ is loosened, when the wedges will recede into their seat slots releasing thereby the sleeve $d$. This latter can now freely be rotated whereby the outer hub is axially withdrawn from off the inner hub. The new wheel is then put on and the sleeve $d$ is rotated in the reverse direction, which causes the new outer hub to screw onto the sleeve until the two hubs are pressed tight upon one another. Then the bolt $f$ is rotated, its threaded inner end screwing into the inner hub, when the wedges $h$ will be forced outwardly again in radial direction and assure the operative position of the sleeve $d$. On withdrawal of the wrench, the cap $l$ will automatically assume the position in which the screw bolt and the nut are securely locked against jarring loose.

What I claim is:—

1. In a vehicle-wheel hub, in combination, an outer spoke-supporting hub, an inner hub, a trunnion having radial slots coaxially integral with said inner hub, a sleeve on said trunnion, a screw connection between said sleeve and said outer hub, wedge members radially operable in said trunnion slots, and adjustable means for keeping said wedge members firmly pressed against said sleeve.

2. In a vehicle-wheel hub, in combination, an outer hub, an inner hub, a tubular trunnion extending from said inner hub and having radial slots, a sleeve on said trunnion, a screw connection between said sleeve and said outer hub, means for preventing axial displacement of said sleeve on said trunnion, and means for preventing rotary displacement of said sleeve on said trunnion comprising wedge members operable in said trunnion slots and a conically tapering screw bolt adapted to screw into the inner hub and its taper part coöperating with said wedge members.

3. In a vehicle-wheel hub, in combination, an outer hub, an inner hub, a tubular trunnion to said inner hub having oppositely disposed radial slots, a sleeve on said trunnion, a screw connection between said sleeve and said outer hub for frictionally pressing both said hubs upon one another, means for preventing axial displacement of said sleeve on said trunnion comprising a thread on the reduced free end of said trunnion and a nut fitting this thread, means for preventing rotary displacement of said sleeve on said trunnion, comprising wedge members operable in said trunnion slots and a conically tapering screw bolt, screwing with its inner end into said inner hub and having its other end profiled and its taper part adapted to coöperate with said wedge members, and means for locking said screw bolt and said nut, comprising an axially yieldable cap fitting said profiled screw bolt end, a toothed rim at the inner circumference of said cap, a toothed rim at the outer circumference at the outer end of said nut, said two rims adapted to be brought into, and out of, operative engagement with each other by respective axial displacement of said cap, and spring means for ordinarily keeping the said toothed rims in mesh.

In testimony whereof I affix my signature in presence of two witnesses.

ETTORE BUGATTI.

Witnesses:
 JOSEPH ROHMER,
 CHARLES HALLEY, Jr.